Figure 1:
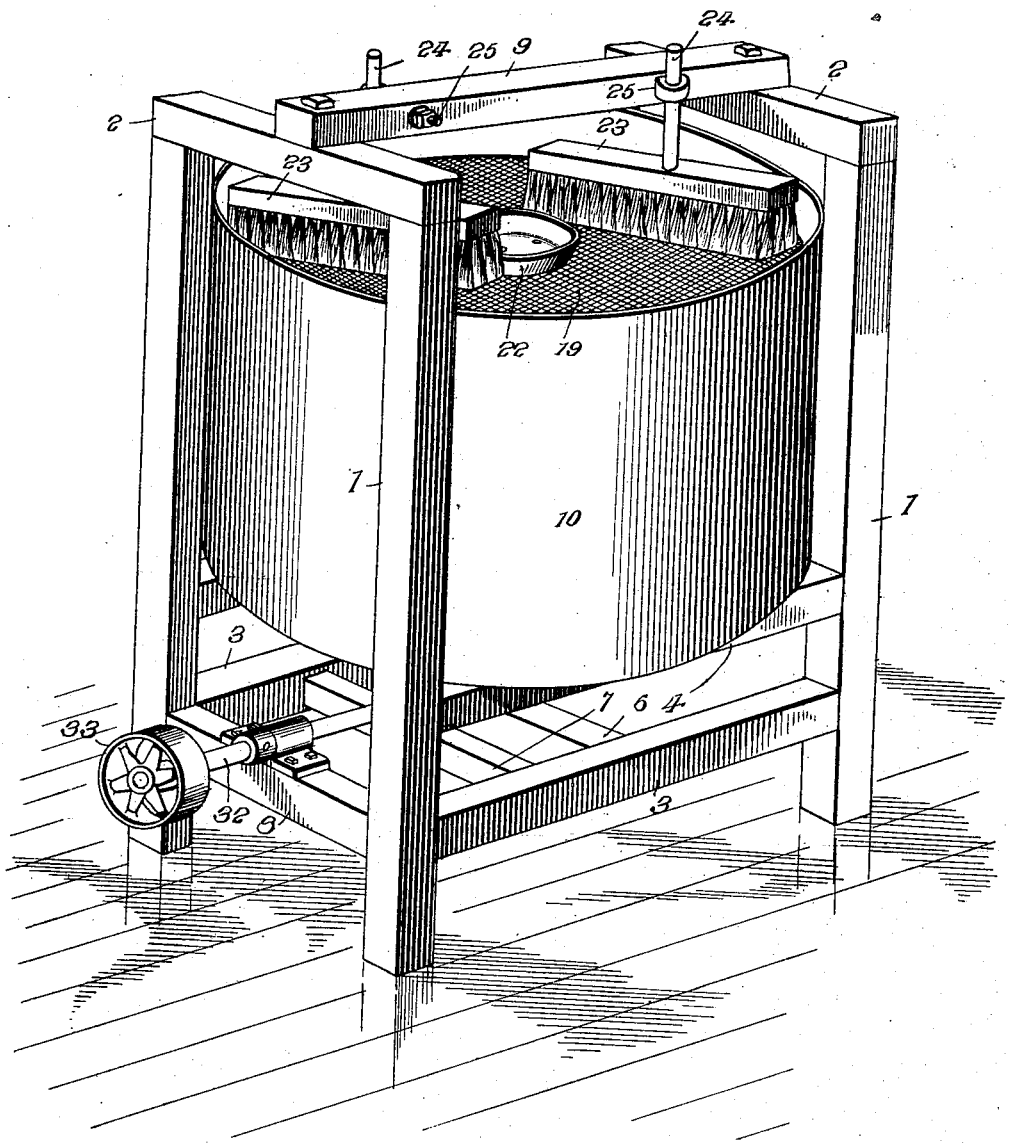

No. 886,966.

D. P. FINDLEY.
ROTARY SCREEN.
APPLICATION FILED MAY 14, 1907.

PATENTED MAY 5, 1908.

2 SHEETS—SHEET 1.

Witnesses

Inventor
D. P. Findley,
By R. H. A. P. Lacey,
Attorneys

No. 886,966.
PATENTED MAY 5, 1908.
D. P. FINDLEY.
ROTARY SCREEN.
APPLICATION FILED MAY 14, 1907.
2 SHEETS—SHEET 2.
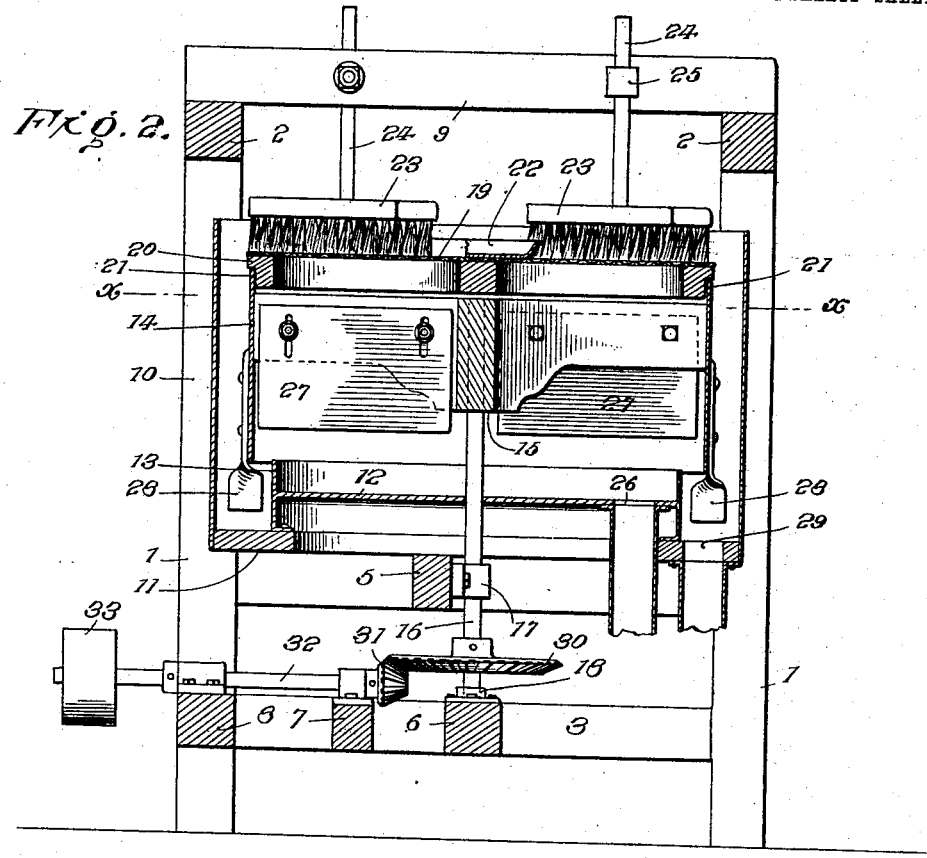
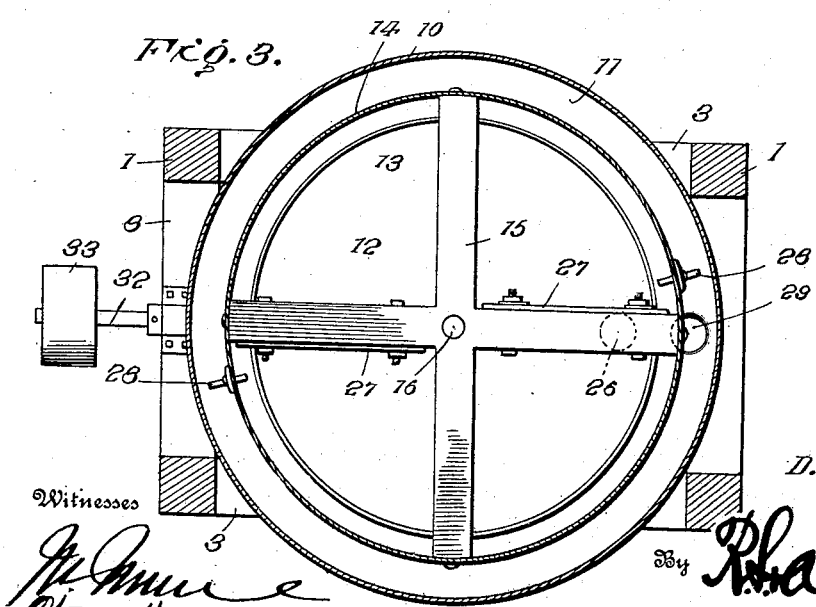
Witnesses
Inventor
D. P. Findley,
By
Attorneys

UNITED STATES PATENT OFFICE.

DANIEL P. FINDLEY, OF MINERAL CITY, OHIO.

ROTARY SCREEN.

No. 886,966. Specification of Letters Patent. Patented May 5, 1908.

Application filed May 14, 1907. Serial No. 373,597.

*To all whom it may concern:*

Be it known that I, DANIEL P. FINDLEY, a citizen of the United States, residing at Mineral City, in the county of Tuscarawas and State of Ohio, have invented certain new and useful Improvements in Rotary Screens, of which the following is a specification.

This invention contemplates certain new and useful improvements in rotary screens for treating clay, cement, grain, or other comminuted, pulverulent or granular materials or substances, wet or dry, and the invention has for its object a simple, durable and efficient construction of revoluble screen which will quickly separate fine particles from the coarse, the latter being shunted by a separate discharge passage or spout from the machine so as to be carried back to the mill to be reground.

With this and other objects in view as will more fully appear as the description proceeds, the invention consists in certain constructions, arrangements and combinations of the parts which I shall hereinafter fully describe and then point out the novel features in the appended claims.

For a full understanding of the invention and the merits thereof and also to acquire a knowledge of the details of construction of the means for effecting the result, reference is to be had to the following description and accompanying drawings; in which:

Figure 1 is a perspective view of my improved rotary screen; Fig. 2 is a vertical sectional view thereof, parts being shown in side elevation; and, Fig. 3 is a horizontal sectional view on the line *x—x* of Fig. 2.

Corresponding and like parts are referred to in the following description and indicated in all the views of the drawings by the same reference characters.

While the framework of my improved screening machine may be of any desired form or construction, I have shown as one embodiment thereof, four upright posts 1 that are connected at their upper ends by end beams 2 and by lower and upper sills 3 and 4.

5, 6, 7 and 8 designate shaft supporting beams, which form parts of the framew rk, and 9 designates an upper cross beam which is supported at its ends on the end beams 2. A cylindrical casing 10 is mounted within the framework, being directly supported upon the upper sills 4 and said casing is closed at its bottom by a base plate 11. This base plate 11 is formed with a concentric bed 12 which is preferably elevated above the base plate, as shown and which is of less diameter than the base plate, so as to form an annular passage or chamber around the casing, and the said bed 12 is provided with an annular upwardly extending flange 13 around its margin, as shown.

The annular body portion 14 of the sifting or screening drum is mounted to revolve around the flange 13 in suspended relation to the bed 12 which forms the stationary bottom of the drum, and said body portion 14 is secured to and carried by a spider 15 which is mounted fast on the upper end of the vertically extending shaft 16. This shaft 16 extends downwardly through the bed 12 and is journaled in a bearing 17 secured to the beam 5, the lower end of the shaft being mounted in a step bearing 18 in the beam 6. The head 19 of the drum is formed of wire mesh, or other suitable foraminous or reticulated material, secured to the two semi-circular frames 20 that are rabbeted around their edges, as indicated at 21, so as to fit within the body portion 14 and rest upon the arms of the spider 15.

A distributing pan 22 is supported centrally upon the head 19, being preferably secured to the cross bars of the frames 20, and said pan is intended to receive the material from any desired type of spout or hopper (not shown), and to distribute the material evenly upon the surface of the sifting head 19, brushes 23 (two in number in the present instance) are suspended from arms 24 that are secured, as by shackle bolts 25 in the upper cross beam 9 and said brushes preferably contact with the surface of the head 19 and preferably extend obliquely to the radius of said head. By removing the brushes, the head may be also removed, as it rests removably on the body portion 14 of the head, and inner portions of the drum repaired or otherwise attended to, whenever necessary.

The bed 12 is formed with a discharge opening 26 for the sifted material to pass therethrough, and through any desired form of spout into any receptacle designed to receive it. Blades 27 are secured to one or more arms of the spider 15 and depend therefrom so as to serve as revoluble conveyers or wings to carry the sifted material towards the discharge opening 26, in the revolutions of the drum over the bed 12. Blades 28 are carried at any desired intervals by the annular body portion 14 of the sifting drum, said blades extending downwardly from the drum into the chamber formed between the bed 12 and the cylindrical casing 10, so as to carry the coarser material around to an opening 29 in the base plate 11, the said coarser material falling through said opening and being carried away to be reground.

While it is obvious that the drum may be revolved by any desired means, either from the top or the bottom of the machine, I shall show in the present instance, for this purpose, the shaft 16 as extending downwardly from the drum and as provided with the gear wheel 30 which meshes with a pinion 31 on one end of a drive shaft 32 supported in bearings on the beams 7 and 8. The drive shaft is provided at one end with a pulley 33 by which it may receive its motion from any suitable source of power.

From the foregoing description in connection with the accompanying drawings, it will be obvious that in the practical operation of the machine, the material to be sifted is deposited from any hopper or spout upon the distributing pan 22 and is thence distributed evenly over the sifting surface or head 19 of the revolving drum. The finer material will pass through said head into the drum and be carried by the blades 27 around to the discharge opening 26, while that material which is too coarse to pass through the meshes or openings of the screen will be finally carried by centrifugal action out over the edge of the drum and drop into the chamber between the drum and the casing 10 where it will be conveyed by the revolving blades of the drum around to the discharge opening 29.

Having thus described the invention, what is claimed as new is:

1. A machine of the character described, comprising a supporting framework, a casing mounted in said framework, a vertically extending shaft mounted to rotate in said casing, a spider carried by said shaft, an open bottom drum secured to the ends of the spider arms, the casing being provided with a bed in the lower end of the drum, the bed being formed with a discharge opening and the casing exterior of the bed being formed with a discharge opening, one discharge opening being distinct from the other, a sifting head comprising a screen and a frame to which the screen is attached, the frame fitting within and supported removably on the upper end of the drum, brushes supported in the framework and adapted to engage with the screen of said sifting head, and blades carried by said drum, as and for the purpose set forth.

2. A machine of the character described, comprising a supporting frame-work, a vertically extending shaft mounted therein, means for rotating said shaft, a spider secured to said shaft and provided with radial arms, a drum secured to the ends of the said arms, the casing being provided with a bed at the lower end of the drum, a screen carried in the upper end of the drum, blades secured to and depending from the drum and projecting into the space between the bed and the casing, and other blades having a vertically adjustable connection with the spider arms within the drum.

In testimony whereof I affix my signature in presence of two witnesses.

DANIEL P. FINDLEY. [L. S.]

Witnesses:
THOMAS C. FERRELL,
L. S. MCKINNEY.